United States Patent [19]

Takezawa et al.

[11] Patent Number: 5,583,658
[45] Date of Patent: Dec. 10, 1996

[54] FACSIMILE APPARATUS EMPLOYING USER-TO-USER INFORMATION ON AN ISDN

[75] Inventors: Katsuhito Takezawa, Kawasaki; Souichi Yamamuro, Tokyo, both of Japan

[73] Assignee: Canon Kabushiki Kaisha, Tokyo, Japan

[21] Appl. No.: 339,881

[22] Filed: Nov. 14, 1994

Related U.S. Application Data

[63] Continuation of Ser. No. 884,188, May 18, 1992, abandoned.

[30] Foreign Application Priority Data

May 22, 1991 [JP] Japan .................................. 3-117108
Jun. 25, 1991 [JP] Japan .................................. 3-153133

[51] Int. Cl.⁶ .................. H04N 1/00; H04M 11/00
[52] U.S. Cl. .................. 358/440; 358/402; 358/403; 358/407; 358/400; 379/100
[58] Field of Search .................. 358/440, 402, 358/407, 403, 400, 434, 435, 438, 439; 379/94, 93, 100, 209; 370/94.1, 110.1, 58.1, 58.2, 62, 60, 60.1

[56] References Cited

U.S. PATENT DOCUMENTS

| | | | |
|---|---|---|---|
| 4,729,033 | 3/1988 | Yoshida | 375/118 |
| 4,833,705 | 5/1989 | Kobayashi | 379/93 |
| 4,910,506 | 3/1990 | Yoshida et al. | 358/400 |
| 4,920,560 | 4/1990 | Kageyama | 379/100 |
| 4,994,926 | 3/1991 | Gordon et al. | 358/400 |
| 5,043,983 | 8/1991 | Dorst et al. | 370/110.1 |
| 5,046,183 | 9/1991 | Dorst et al. | 370/110.1 |
| 5,046,189 | 9/1991 | Kainuma | 379/100 |
| 5,073,890 | 12/1991 | Danielsen | 370/58.2 |
| 5,095,445 | 3/1992 | Sekiguchi | 358/405 |
| 5,121,221 | 6/1992 | Hamano et al. | 350/426 |
| 5,146,349 | 9/1992 | Mori | 358/407 |
| 5,146,598 | 9/1992 | Takezawa et al. | 395/721 |
| 5,263,082 | 11/1993 | Kotake et al. | 379/93 |
| 5,309,511 | 5/1994 | Kotake | 379/201 |

FOREIGN PATENT DOCUMENTS

| | | |
|---|---|---|
| 0283295 | 9/1988 | European Pat. Off. |
| 0344962 | 12/1989 | European Pat. Off. |
| 0412461 | 2/1991 | European Pat. Off. |
| 2169174 | 7/1986 | United Kingdom. |

OTHER PUBLICATIONS

Philips Telecom, & Date Review, vol. 45, No. 3, Sep. 1987, pp. 35–41 Hesdahl, "the digital voice/data terminal SOPHO–SET 5375D".

Canon, Inc., "Canon Fax–L770:Instruction Book," 1990, pp. 58–66.

*Primary Examiner*—Kim Vu
*Assistant Examiner*—Kimberly A. Williams
*Attorney, Agent, or Firm*—Fitzpatrick, Cella, Harper & Scinto

[57] ABSTRACT

Disclosed in a facsimile apparatus which performs communication using the user-to-user of an ISDN. User-to-user information inputted from a control panel and used when an outgoing call is made is capable of being registered in a buffer memory as one-touch dialing data or abbreviated dialing data, or user-to-user information employed in communication is capable of being registered in the buffer memory as redialing data when communication ends. The user-to-user information is registered as data only with regard to one-touch dialing or abbreviated dialing limited in advance.

6 Claims, 11 Drawing Sheets

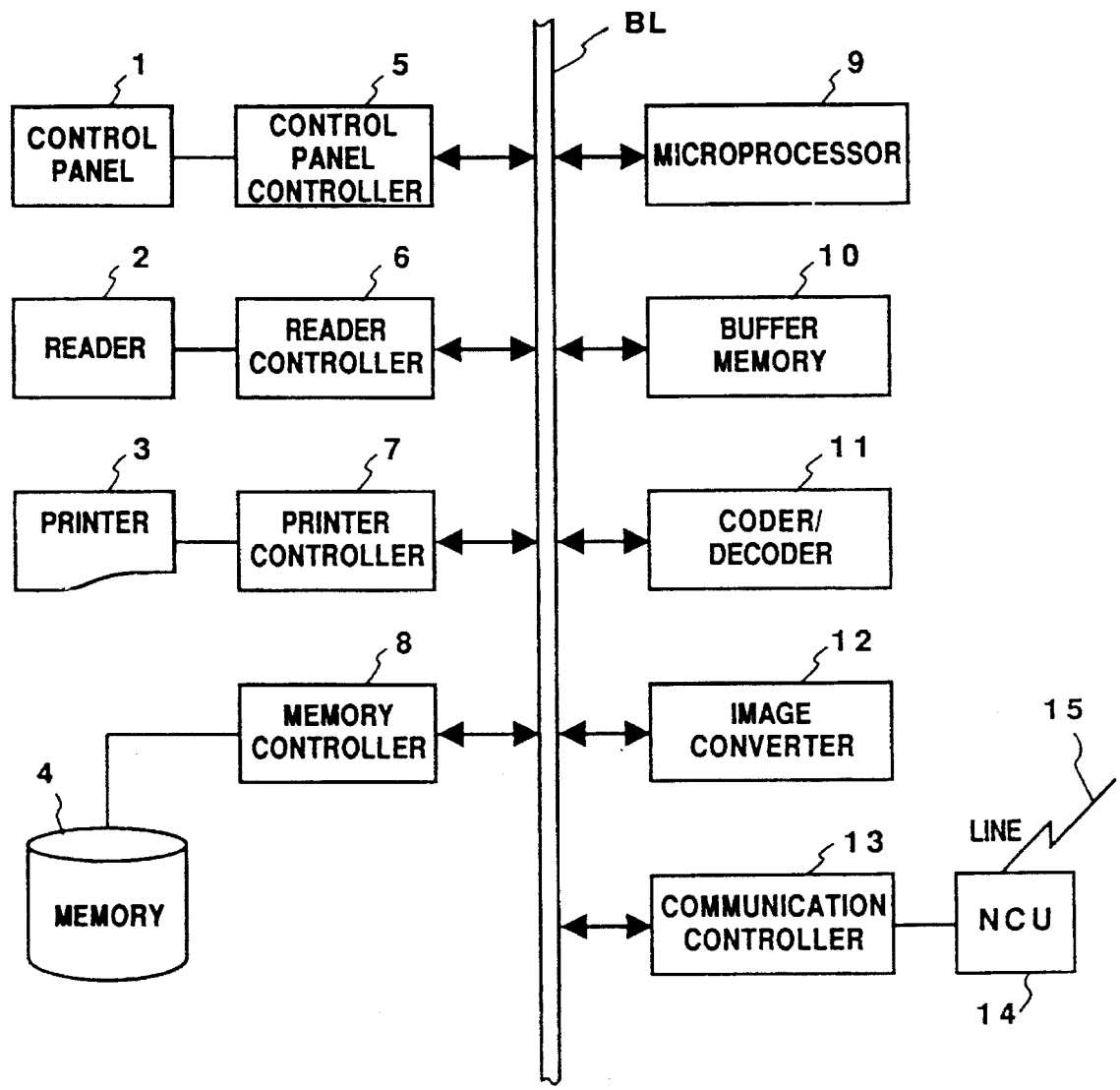
F I G. 1

```
ONE-TOUCH DIALING REGISTRATION
TEL = 161
```

FIG. 5

```
ONE-TOUCH DIALING REGISTRATION
TEL = 161-1244
```

FIG. 6

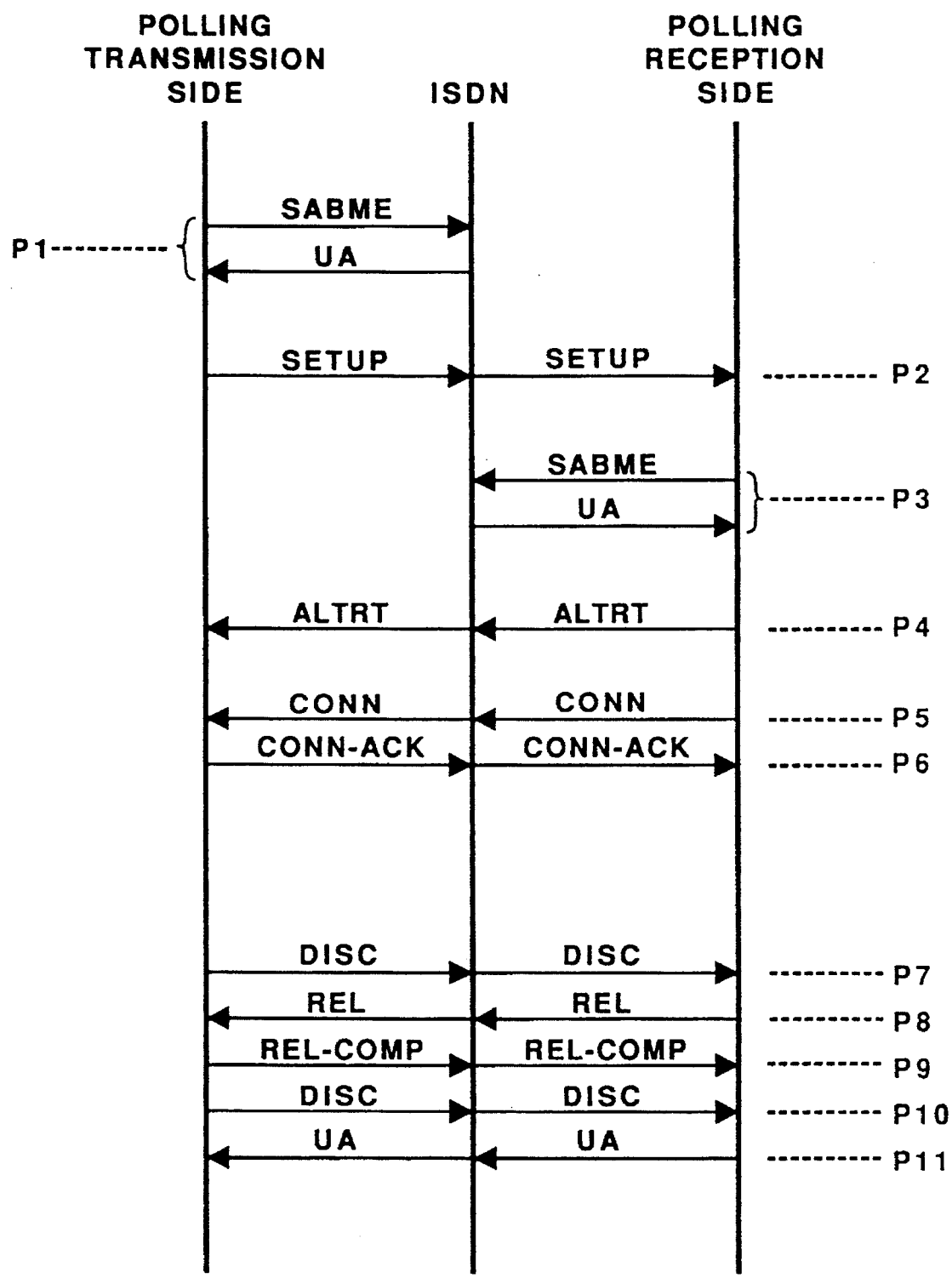
F I G. 10

FACSIMILE APPARATUS EMPLOYING USER-TO-USER INFORMATION ON AN ISDN

This application is a continuation of application Ser. No. 07/884,188 filed May 18, 1992, now abandoned.

BACKGROUND OF THE INVENTION

1. Field of the Invention

This invention relates to a facsimile apparatus connected, by way of example, to an ISDN, having a function for managing destination information and a polling transmitting/receiving function. The invention relates also to a communication method involving this facsimile apparatus.

2. Related Art

In a conventional facsimile apparatus, registration for one-touch dialing, abbreviated dialing or redialing is such that only the subscriber telephone number at the destination of the called party, or the abbreviated name of the subscriber in addition to the subscriber telephone number, is registered. As a consequence, in a facsimile apparatus connected to an ISDN, user-to-user information employed at the time of an outgoing call cannot be registered as data for one-touch dialing, abbreviated dialing or redialing.

Since the subscriber's telephone number and the abbreviated name of the subscriber are registered as the data for one-touch dialing, abbreviated dialing or redialing in the prior art described above, the following drawbacks are encountered in communication using user-to-user information at the time of an outgoing call:

(1) In a communication operation by one-touch dialing or abbreviated dialing, it is necessary to provide means for subsequently inputting user-to-user information.

(2) Since user-to-user information has not been registered, communication becomes impossible in a communication operation by redialing.

Further, in a facsimile apparatus, which is an example of a communication terminal connected to an ISDN and provided with a polling transmission function, the arrangement is such that when the called party's machine (the terminal on the side performing polling reception) is informed of the completion of polling standby (namely a state in which preparations for polling transmission have been completed), this is carried out by transmission/reception of a command or image data in B-channel communication or by voice in B-channel communication.

As a consequence, in a case where the calling party's own machine notifies the called party's machine of the fact that polling standby has been completed, this cannot be carried out unless the B-channel of the ISDN is connected as well as the D-channel.

SUMMARY OF THE INVENTION

An object of the present invention is to provide a facsimile apparatus, and a communication method thereof, in which it is possible to register inputted user-to-user information as one-touch dialing and abbreviated dialing data, or in which, when redialing data is registered at the end of communication, the user-to-user information employed in the terminated communication is capable of being recorded and held and registered as redialing data.

Another object of the present invention is to provide a facsimile apparatus, and a communication method thereof, in which, merely by transmitting/receiving user-to-user information within a signal in a D-channel and layer 3, notification of the completion of polling standby can be performed between terminals and occupation of the B-channel can be eliminated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram showing a facsimile apparatus according to a first embodiment of the present invention;

FIG. 5 is a diagram showing an example of a display of guidance presented on a display of a control panel when another party's subscriber's number is inputted in one-touch dialing registration according to the first embodiment;

FIG. 6 is a diagram showing an example of a display of guidance presented on a display of a control panel when user-to-user information is inputted in one-touch dialing registration according to the first embodiment;

FIG. 10 is a diagram showing a D-channel, layer-3 protocol in the second embodiment;

DESCRIPTION OF THE PREFERRED EMBODIMENTS

Figure 2:
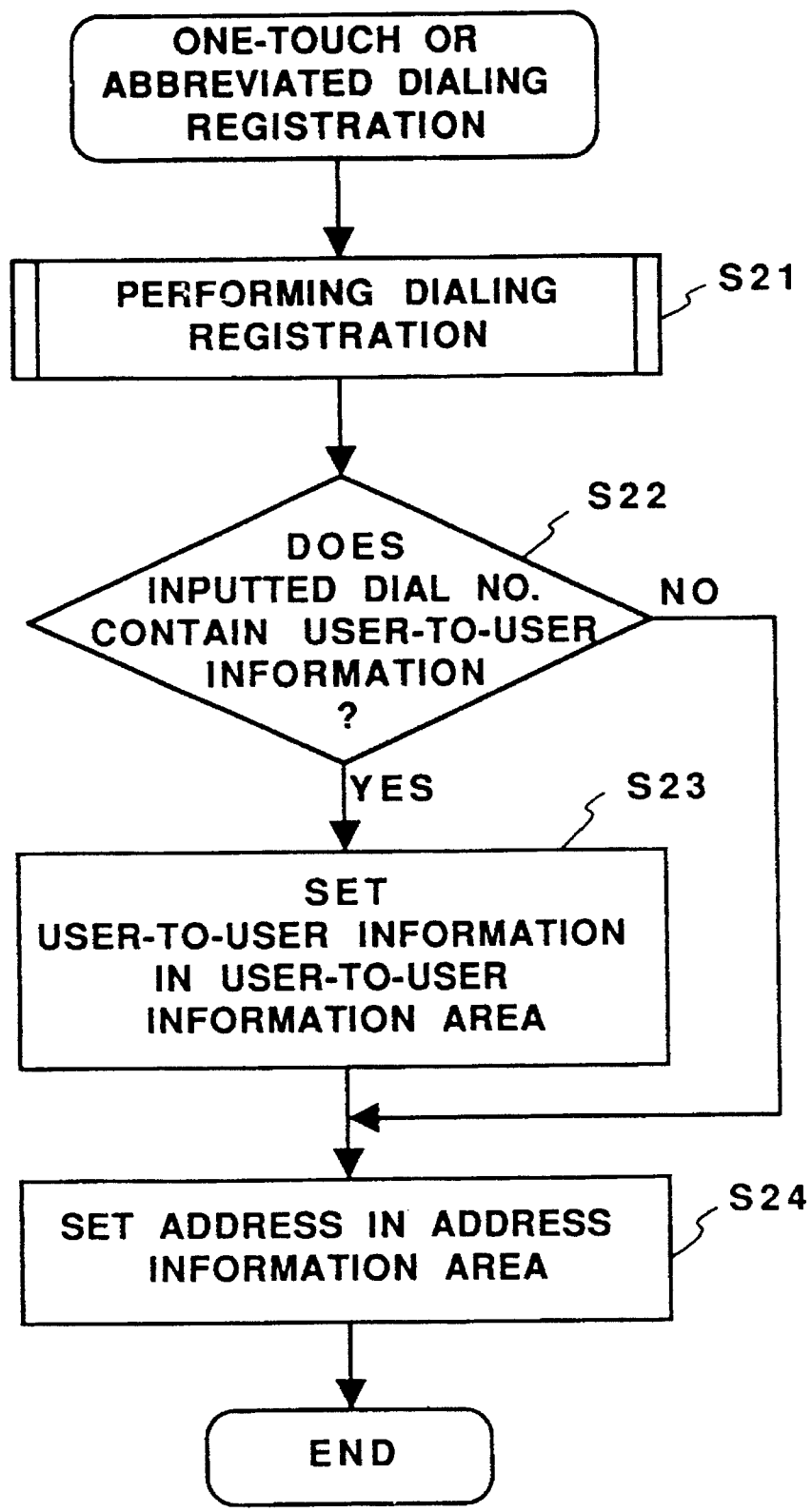
FIG. 2 is a flowchart illustrating processing for registering one-touch dialing and abbreviated dialing data in the first embodiment.

Embodiments of the present invention will now be described in detail with reference to the drawings.

First Embodiment

FIG. 1 is a flowchart illustrating a processing procedure on the receiving side according to a first embodiment of the invention.

As shown in FIG. 1, the facsimile apparatus includes a control panel 1 having an array of dialing keys and switches manipulated by an operation. The control panel 1 is provided with one-touch dialing keys, abbreviated dialing keys, etc. The apparatus further includes a reader 2 for photoelectrically scanning an original to be transmitted and forming an image signal based on the scan, and a printer 3, which comprises a dot printer such as a laser beam printer (LBP) or thermal-transfer printer, for converting a received signal that has arrived via a line into a dot pattern and recording the dot pattern on recording paper.

The apparatus if further provided with a memory 4 comprising a non-volatile memory such as a hard disk or floppy disk, a control-panel controller 5 for controlling the control panel 1, a reader controller 6 for controlling the reader 2, a printer controller 7 for controlling the printer 3, and a memory controller 8 for controlling the memory 4.

The overall operation of the facsimile apparatus is controlled by a microprocessor 9, which incorporates a ROM storing a program shown in FIG. 2 and described later, and a RAM for temporarily storing data such as interface data shown in FIGS. 3 and 4. A buffer memory 10 stores image information to be transmitted and received, and a coder/decoder 11 for coding and compressing image data read by the reader 2 or for decompressing compressed image data sent from a line 15.

An image converter 12 converts the resolution and paper size, etc., of transmitted image data so as to conform to the reception capability of the destination of the transmission. A communication controller 13 supervises control of communication between this facsimile apparatus and another communication apparatus connected to the line 15. The communication controller 13 is capable of performing appropriate control regardless of whether the two apparatus are both G3/G4 machines one is G3 and the other G4. Numeral 14 denotes a network controller (NCU), and BL represents a bus line which interconnects the above-described elements in the manner shown in FIG. 1.

Control of facsimile communication according to the first embodiment constructed as set forth above will now be described.

Figure 3:
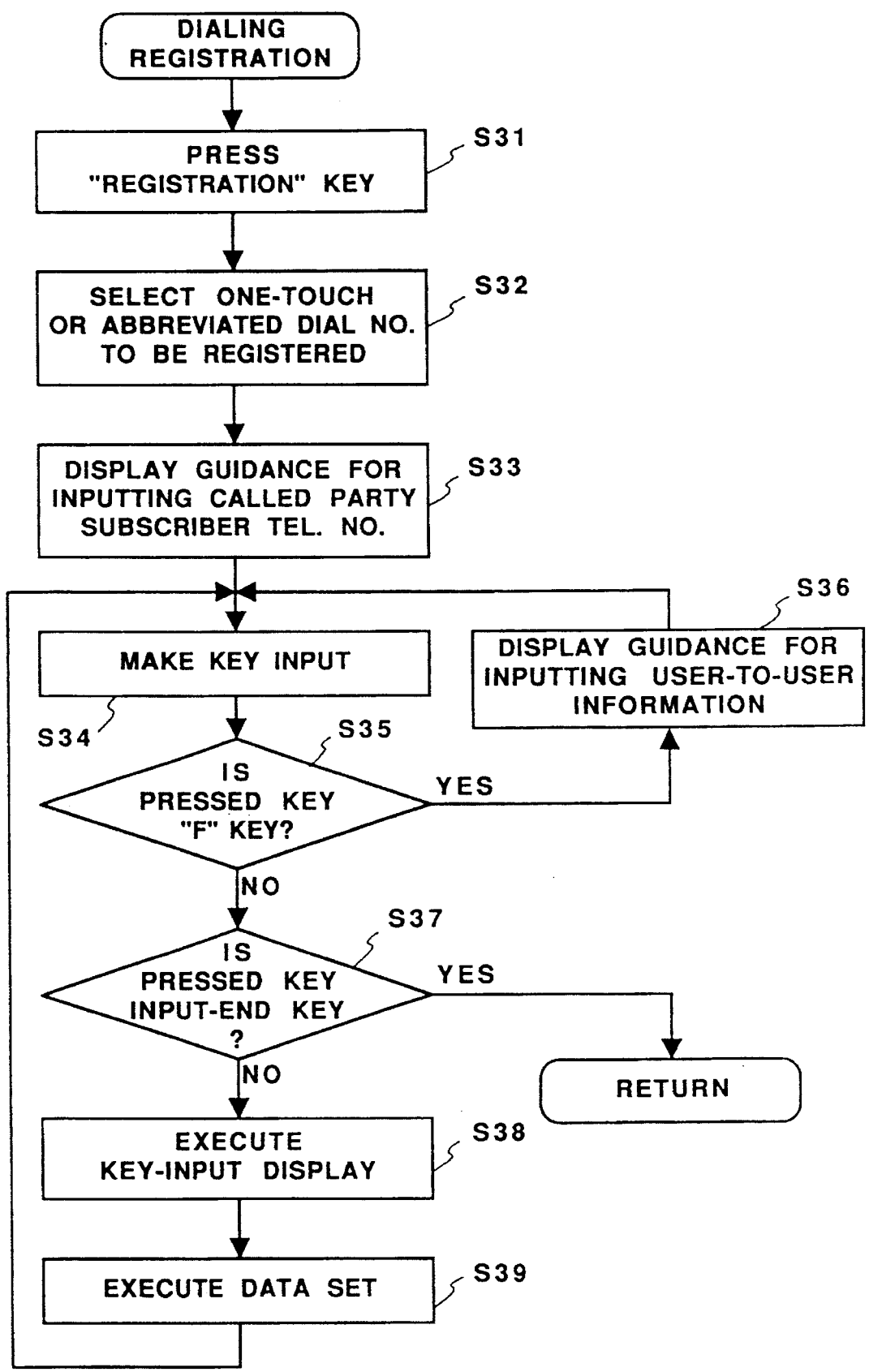
FIG. 3 is a flowchart illustrating processing for inputting dial numbers when registering one-touch dialing or abbreviated dialing data in the first embodiment.
Figure 4:
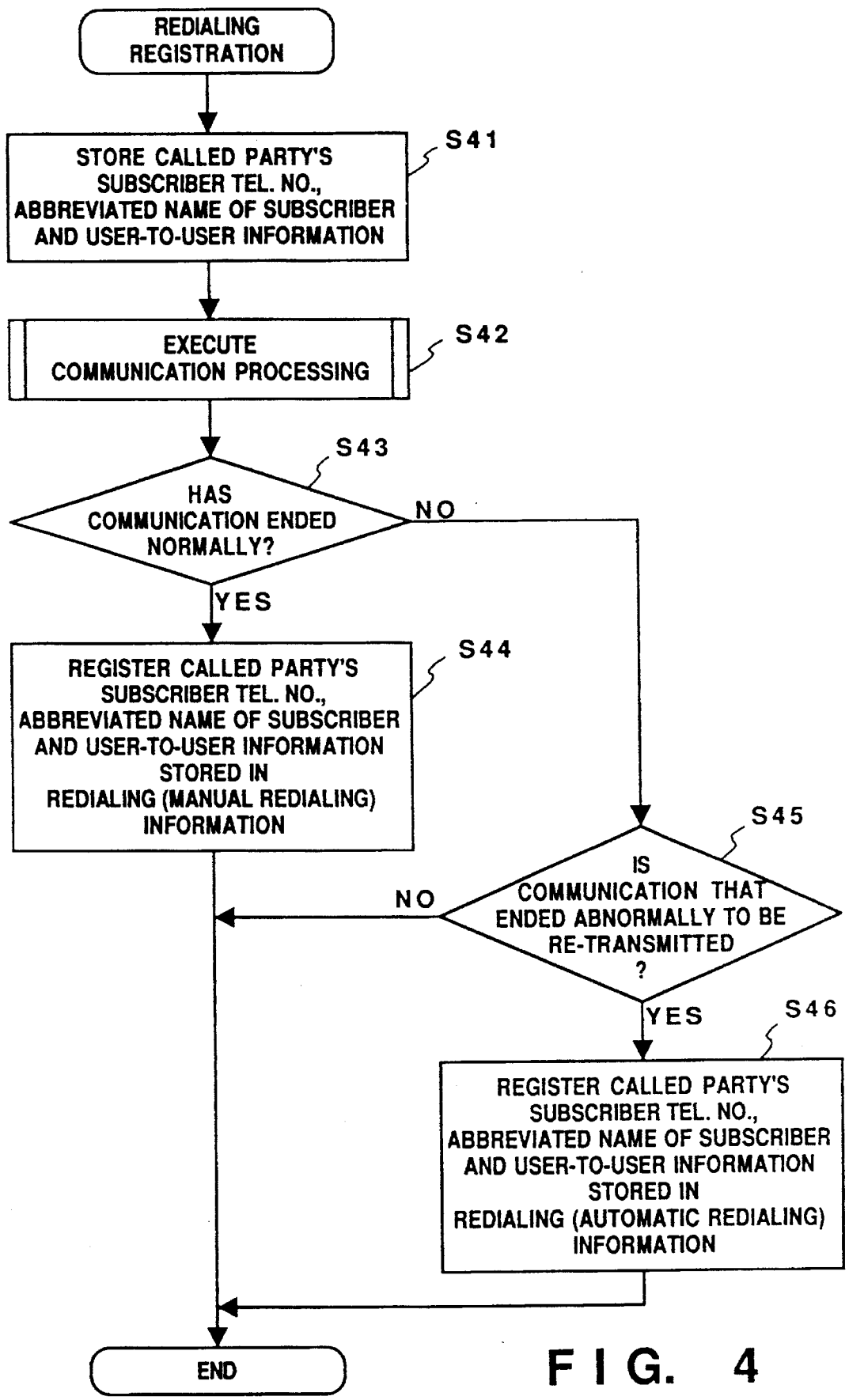
FIG. 4 is a flowchart illustrating processing for registering redialing data in the first embodiment.

FIG. 2 is a flowchart illustrating processing for registering one-touch dialing and abbreviated dialing data in the first embodiment, FIG. 3 is a flowchart illustrating processing for inputting dial numbers when registering one-touch dialing or abbreviated dialing data in the first embodiment, FIG. 4 is a flowchart illustrating processing for registering redialing data in the first embodiment, FIG. 5 is a diagram showing an example of a display of guidance presented on a display of a control panel when a called party's subscriber's number is inputted in one-touch dialing registration, and FIG. 6 is a diagram showing an example of a display of guidance presented on a display of a control panel when user-to-user information is inputted in one-touch dialing registration.

Processing for registering user-to-user information in one-touch dialing or abbreviated dialing will now be described with reference to the flowcharts of FIGS. 2 and 3.

First, at step S21 in FIG. 2, the registration processing shown in FIG. 3 is executed. Specifically, at step S31 in FIG. 3, a "REGISTRATION" key for performing one-touch dialing or abbreviated dialing is pressed on the control panel 1, whereupon a one-touch dialing or abbreviated dialing number to be registered is selected at step S32. When selection of the one-touch dialing or abbreviated dialing number to be registered has ended, guidance for inputting the called party's subscriber telephone number to be registered for one-touch dialing or abbreviated dialing is displayed on the display (not shown) provided on the control panel 1. FIG. 5 illustrates an example of the display of guidance presented on the display when entering the called party's subscriber telephone number.

Upon confirming the guidance, the operator enters the called party's subscriber telephone number by pressing the keys on the control panel 1. To this end, the system waits for a key input at step S34. When the key input has been made, the program proceeds to step S35, at which it is determined whether the pressed key is an "F NETWORK" key, which indicates that this is an occasion for changing over the user-to-user information input. If the pressed key is the "F NETWORK" key, the program proceeds to step S36, at which the guidance for input of the user-to-user information is displayed on the display provided on the control panel 1. FIG. 6 illustrates an example of the display of guidance presented on the display when entering user-to-user information. The display presented in FIG. 6 is limited to a case where the apparatus is one in which a one-touch dial number or abbreviated dial number currently registered is number for which an input of user-to-user information is possible, or in which there is no limitation placed upon one-touch dialing or abbreviated dialing in registration of user-to-user information. The program returns from step S36 to step S34, where the data input of user-to-user information is made.

It should be noted that the present apparatus is one in which input of user-to-user information is allowed only in specific one-touch dialing and abbreviated dialing. In a case where currently registered one-touch dial numbers and abbreviated dial numbers are numbers for which input of user-to-user information is not possible, the display of step S36 is not presented, the "F NETWORK" key is rendered ineffective and the program returns to step S34.

If it is found at step S35 that the pressed key is not the "F NETWORK" key, the program proceeds to step S37, where it is determined whether the pressed key is a user-to-user information input-end key. If it is determined that the pressed key is the user-to-user information input-end key, then dial registration processing is terminated and the program returns. However, if it is found at step S37 that the pressed key is not the user-to-user information input-end key, this means an input of the called party's subscriber number by the "F NETWORK" key, and the program proceeds to step S38. Here processing for displaying the inputted key data is displayed on the display of the control panel 1. Then, at step S39, the inputted data is saved in a buffer memory 10.

Through the dial registration processing (step S21 in FIG. 2) shown in FIG. 3, processing for correctly inputting the called party's subscriber telephone number plus the user-to-user information is executed, whereby the called party's subscriber telephone number plus the user-to-user information is stored in the buffer memory 10. Consequently, when the processing of step S21 in FIG. 2 ends, it is determined at the next step S22 whether the inputted dial information contains user-to-user information. If user-to-user information has not been entered, the program proceeds to step S24.

If user-to-user information has been entered, on the other hand, the program proceeds to step S23, at which the user-to-user information saved at step S21 is set in the user-to-user information registration area of the particular one-touch dial or abbreviated dial number of the one-touch dial or abbreviated dial number in the buffer memory 10. Next, at step S24, the called party's subscriber telephone number saved in the buffer memory 10 by the dial registration processing of step S21 is saved in the called party's subscriber telephone-number data registration area of the pertinent number of one-touch dialing or abbreviated dialing in the buffer memory 10. The processing of FIG. 2 is then ended.

Processing for registering user-to-user information in redialing data according to the first embodiment will now be described with reference to the flowchart of FIG. 4.

In processing for registering user-to-user information as redialing data, information used when placing an outgoing call and during communication, namely the other party's subscriber telephone number, subscriber's abbreviated name, user-to-user information and other information relating to the called party's terminal, is saved in the buffer memory 10 at step S41 prior to the start of communication. Then, at step S42, communication in accordance with saved contents is carried out.

This is followed by step S43, at which it is determined whether communication ended normally. If communication ended normally, the program proceeds to step S44, at which the called party's subscriber telephone number, subscriber's abbreviated name, user-to-user information and other information relating to the called party's terminal, which were saved in the buffer 10 at step S41, are set in a redialing (manual redialing) information area in the buffer memory 10. This information area is used in a redialing (manual redialing) function by which the operator places an outgoing call using a "REDIAL" key on the control panel 1. The processing of FIG. 4 is then terminated.

On the other hand, in a case where it is determined at step S43 that communication ended abnormally, the program proceeds to step S45, at which it is determined whether the reason for the abnormal end to communication is such that the call may be re-transmitted (e.g., because the reason is that the called party's terminal was bus, the line was crowded, etc.). If the call is not one which should be re-transmitted (e.g., if there is no destination for the dialed call), processing is ended, the communication information is construed to be abnormal and nothing is registered for the redialing information. Alternatively, depending upon the system, redialing (manual redialing) information that has already been registered is erased. Processing is then terminated.

If it is found at step S45 that the reason for the abnormal end to communication is such that re-transmission is allowed, the program proceeds to step S46. Here the called party's subscriber telephone number, subscriber's abbreviated name, user-to-user information and other information relating to the called party's terminal, which were saved in the buffer memory 10 at step S41, are set in a redialing (automatic redialing) information area in the buffer memory 10. This information area is used in a redialing (automatic redialing) function by which the apparatus performs redialing automatically. The processing of FIG. 4 is then terminated.

Thus, by making it possible to register user-to-user information, which is employed at the time of an outgoing call, as one-touch dialing or abbreviated dialing data, it is no longer necessary to subsequently enter user-to-user information, in communication which employs user-to-user information, even if one-touch dialing or abbreviated dialing is used.

Further, by making it possible to register user-to-user information only in a specific one-touch dialing or abbreviated dialing registration area, it is no longer necessary to prepare a user-to-user information registration area for all one-touch dial and abbreviated dial numbers. As a result, memory can be conserved.

Furthermore, a redialing function can be implemented even in communication which employs user-to-user information.

Modification of the First Embodiment

The first embodiment has been described with regard to the F network of an ISDN. However, the invention is not limited to the F network of an ISDN. An arrangement is possible in which a center machine is connected to an ISDN. For example, a mail system operation utilizing user-to-user information is conceivable, in which case effects similar to those described above can be attained.

In accordance with the first embodiment, as described above, it is possible to register user-to-user information as one-touch dialing and abbreviated dialing data by inputting user-to-user information, which is employed at the time of an outgoing call, upon inputting the subscriber telephone number of the called party.

Furthermore, when redialing data is registered at the end of transmission, the user-to-user information used in the transmission is recorded and held, thereby making it possible to register the user-to-user information as redialing data.

Second Embodiment

Figure 7:
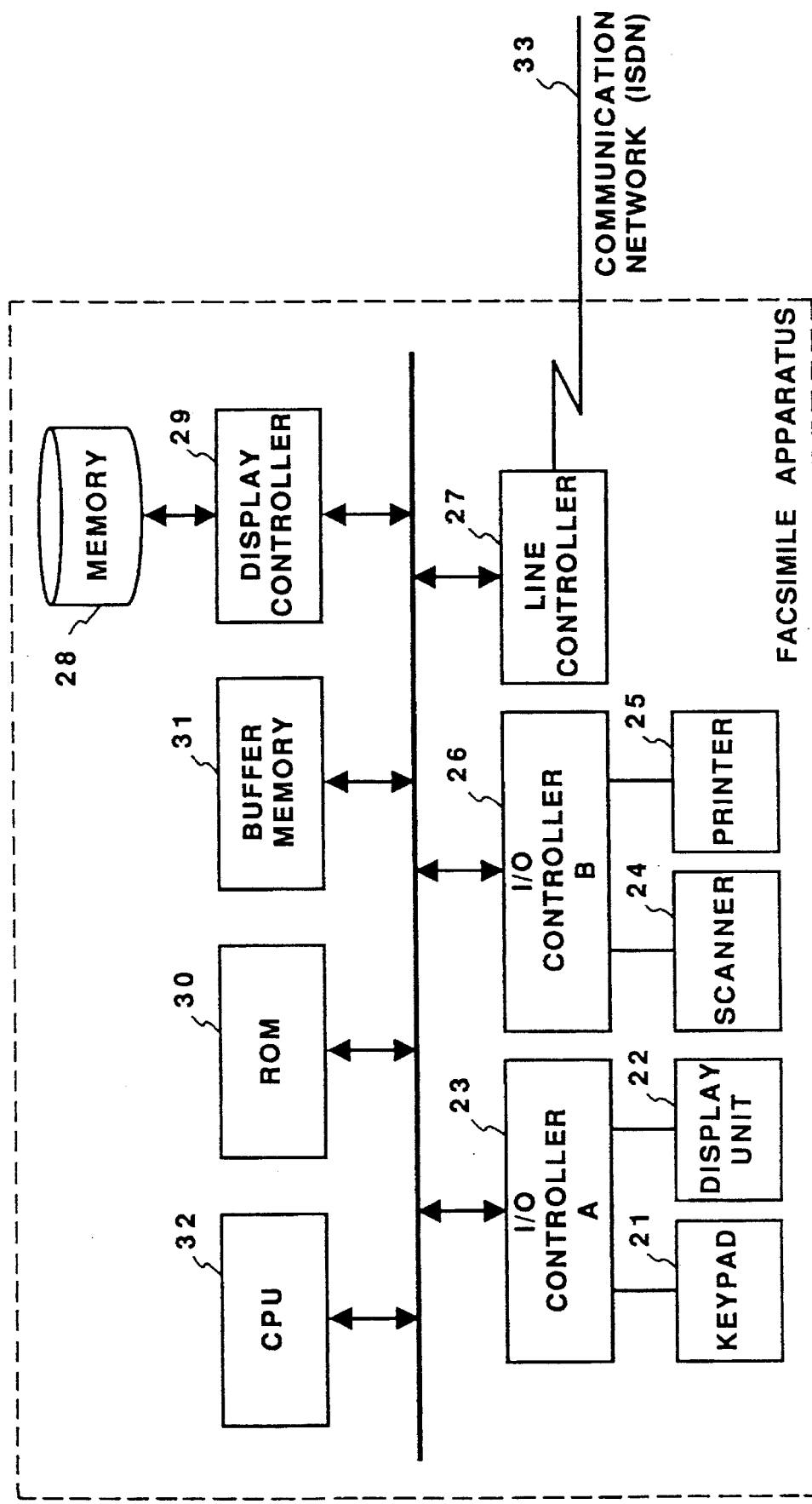
FIG. 7 is a block diagram showing a facsimile apparatus according to a second embodiment of the present invention.

FIG. 7 is a block diagram showing a facsimile apparatus according to a second embodiment of the present invention. The apparatus includes a keypad 21 used for operating the apparatus, a display unit 22 for displaying various messages, an I/O controller A 23 for controlling the keypad 21 and the display unit 22, a scanner 24 constituted by an optical system and a CCD line sensor for reading originals, a printer 25 for printing out received documents and the like, an I/O controller B 26 for controlling the scanner 24 and printer 25, a line controller 27 for controlling communication performed by a communication network (ISDN) 33, a memory 28 for storing image data relating to received documents or polling transmission documents, etc., a memory controller 29 for controlling the reading and writing of data relative to the memory 28, a read-only memory (ROM) 30 storing programs, described below, for controlling the functions of this facsimile apparatus, a buffer memory 31 used in processing image data, and a microprocessor (CPU) 32 serving as a main controller for supervising overall control of the apparatus in accordance with the programs stored in the ROM 30.

With regard to facsimile communication control in this facsimile apparatus after a communication channel with a called apparatus has been formed, communication is carried out in accordance with a well-known facsimile transmission procedure. Accordingly, the description thereof is omitted and only the communication means specific to the second embodiment will be described with reference to the drawings. In the description to follow, it is assumed that the facsimile apparatus on the polling transmission and reception sides are identical in construction, and both will be described using FIG. 7.

Figure 8:
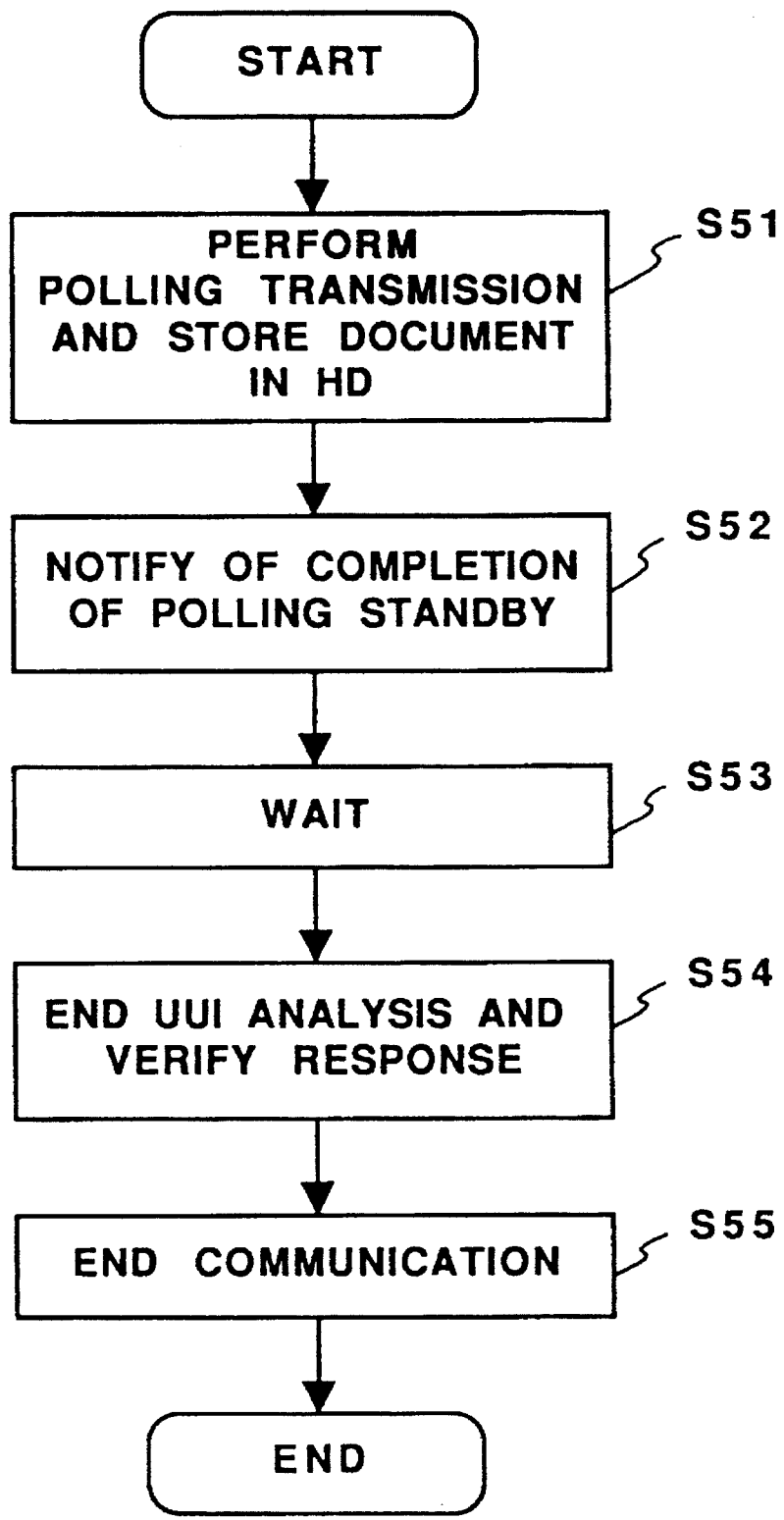
FIG. 8 is a flowchart illustrating a processing procedure on the transmitting side according to the second embodiment.
Figure 9:
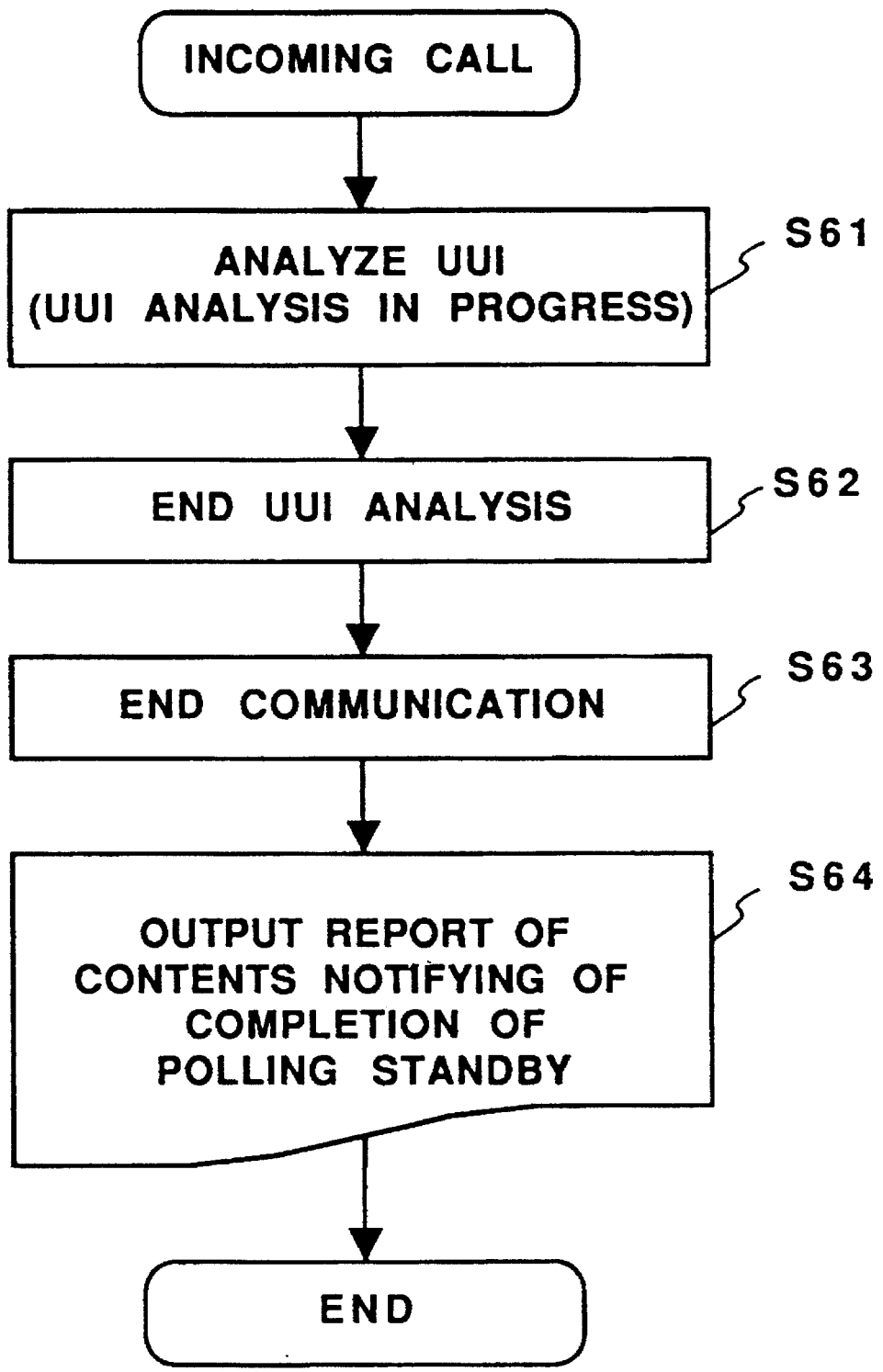
FIG. 9 is a flowchart illustrating a processing procedure on the receiving side according to the second embodiment.

FIG. 8 is a flowchart illustrating a processing procedure on the transmitting side for transmitting notification of completion of polling standby to the terminal of the called party by user-to-user information (hereinafter referred to as "UUI") in the D-channel and layer 3, and FIG. 9 is a flowchart illustrating the processing procedure on the side which receives the UUI.

Figure 11:
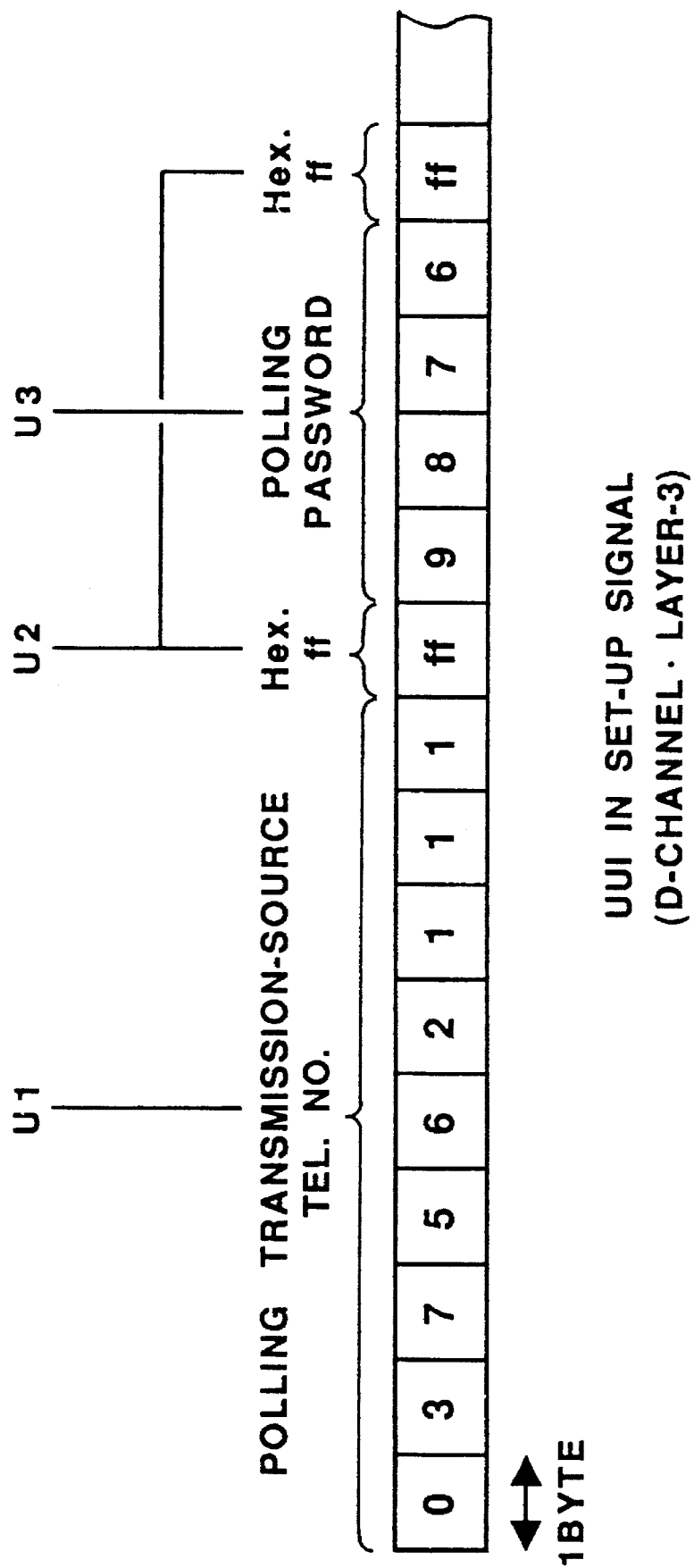
FIG. 11 is a diagram showing the construction of an UUI in a SET-UP signal according to the second embodiment.

First, at step S51 shown in FIG. 8, a document for polling transmission is stored in the memory [hereinafter referred to simply as the "HD" (hard disk)] 28 in the facsimile apparatus of the second embodiment. In other words, the apparatus is placed in polling standby. When polling standby has been completed, an outgoing call is placed at step S52 to the terminal that is to perform polling reception. FIG. 10 illustrates the communication procedure of an ISDN.D channel according to the second embodiment. This is in line with a well-known communication protocol based upon the definition of CCITT.SG.X VIII, and therefore a detailed description thereof is omitted. When the call is made at step S52, the UUI signifying the information of polling standby completion shown in FIG. 11 is placed in a SET-UP signal (P2 shown in FIG. 10) in D-channel.layer 3. As depicted in FIG. 11, the UUI incorporates a polling transmission-source TEL No. U1 and a polling password U3. Further, U2 represents a hexadecimal "ff", which signifies the boundary between the polling transmission-source TEL No. U1 and the polling password U3.

Figure 12:
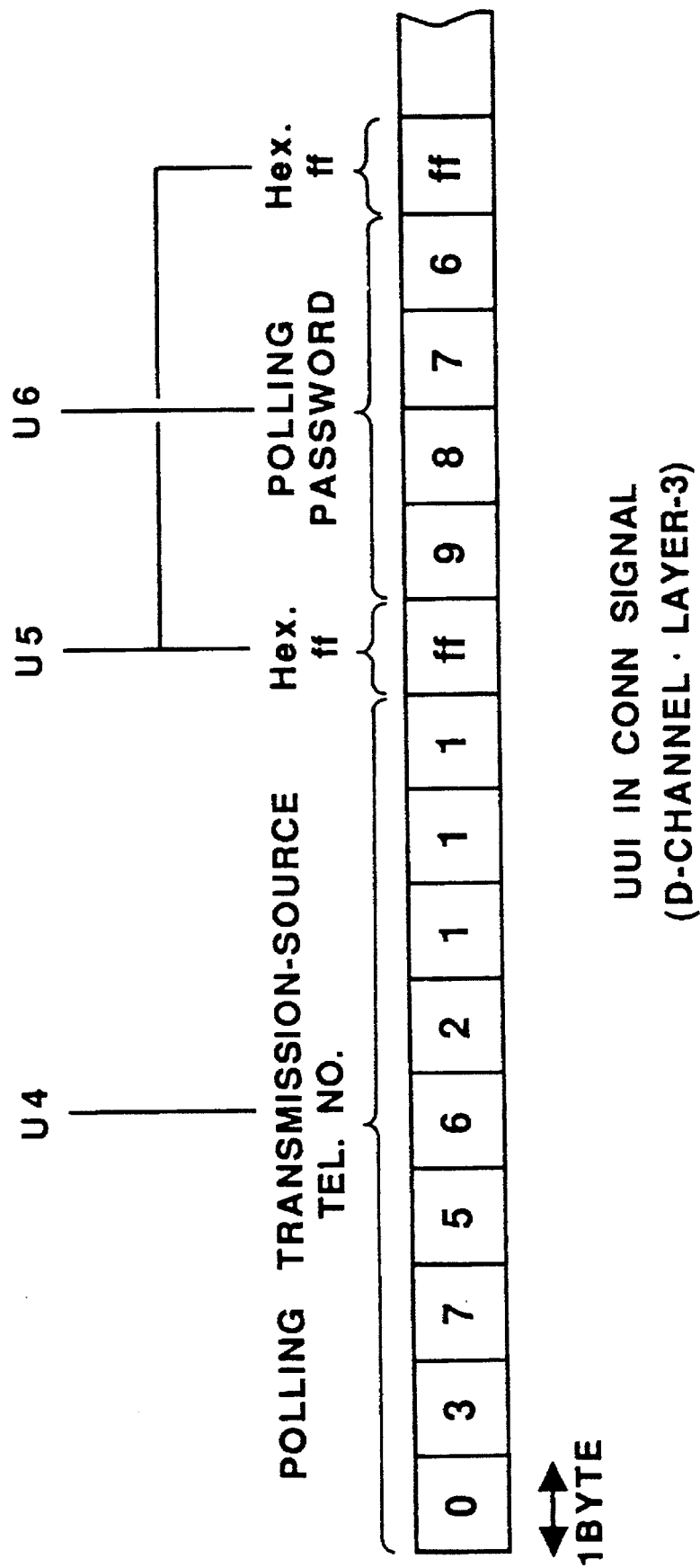
FIG. 12 is a diagram showing the construction of an UUI in a CONN signal according to the second embodiment.

The terminal which has received the incoming call by the SET-UP signal P2, namely the facsimile apparatus on the side performing polling reception of the document stored at step S51 in FIG. 8, analyzes the UUI (see FIG. 11) in the signal P2 by executing the processing of step S61 in FIG. 9 in accordance with the program in the ROM 30. At this time, an ALERT signal P4 is outputted to the calling side, as shown in FIG. 10. Next, when analysis of the UUI ends and the contents of analysis are verified, the program proceeds to step S62 in FIG. 9. Here UUI (see FIG. 12) signifying a response is placed in a D-channel.layer-3 CONN signal in the same communication, and the signal is transmitted to the calling party. As shown in FIG. 12, the UUI contains a polling transmission-source TEL No. U4 and a polling password U6 (the same data as U1, U3 mentioned above). This data is written in the buffer memory 31 in advance.

When the facsimile apparatus on the calling side receives the signal P5 shown in FIG. 10, processing proceeds from the waiting state of step S53 in FIG. 8 to step S54, at which response from the called party is verified, i.e., at which the UUI in the CONN signal P5 of FIG. 12 is analyzed. Since the UUI contains the data U4, U6 that is the same as U1, U3 in FIG. 11, it is verified that U1 and U4 are the same, as well as U3 and U6, whereby it is confirmed that the called machine has been notified of the completion of polling standby.

Next, at step S55, a DISC signal P7 shown in FIG. 10 is sent in order to disconnect the D-channel and terminate communication. Owing to the signal P7, processing proceeds to step S63 in FIG. 9 on the called side, and communication is terminated. Upon receiving notification of the end of polling standby by the UUI from the calling side, the facsimile apparatus at step S64 so informs the operator by producing a report from the polling transmission-source TEL No. U4 and a polling password U6, which have been written in the buffer memory 31, and outputting this report to the printer 25. Owing to this report, the operator on the called side is capable of executing a well-known reception operation (polling reception) in order to receive the document that has been stored in the HD 28 of the other party's machine.

In accordance with the second embodiment described above, notification of the completion of polling standby can be performed between terminals merely by using the UUI in the D-channel.3-layer signal. In addition, the need to notify of the completion of polling standby by occupying the B-channel can be avoided.

Modification of the Second Embodiment

In the second embodiment described above, UUI signifying notification of the called machine of the fact that polling standby has been completed is placed in the D-channel.layer-3 SET-UP signal, and UUI signifying an answer from the called machine in response to the notification is placed in the D-channel.layer-3 CONN signal. However, the same effects can be obtained even such information is placed other signals of D-channel communication, such as in a USER INFORMATION signal.

In addition, though the UUI is restricted to the polling transmission-source TEL No. and the polling password, the invention is not limited thereto but can also be applied to a case where the polling reception side places other necessary information on a signal.

In the second embodiment, an example is described in which the created report is outputted by a printer as a means for informing the operator of the data content of the UUI sent from the facsimile apparatus in which polling standby has been completed. However, it is possible to inform the operator by a display presented on the display panel or by an audio output.

Furthermore, in the second embodiment, a facsimile apparatus connected to an ISDN is taken as an example. However, the same effects can be obtained even if the present invention is applied to another communication terminal, such as a personal computer.

In accordance with the second embodiment, as described above, it is possible to give notification of the completion of polling standby solely by D-channel communication, without occupying the B-channel, and the functions of a communication terminal may be enhanced. In a case where notification of the completion of polling standby is received from the calling side by D-channel communication, it is possible to give notification of the response during the same D-channel communication, so that the reliability and functionality of the communication terminal may be enhanced.

It should be noted that the present invention may be applied to a system constituted by a plurality of apparatus or to a single apparatus. Further, it goes without saying that the invention is applicable also to a case where a program for implementing the invention is supplied to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus for performing communication using user-to-user information included in a SETUP message for calling an integrated services digital network, comprising:

manual input means for inputting user-to-user information corresponding to a destination;

registration means for pre-registering the manually-input user-to-user information corresponding to the destination;

manual instruction means for manually inputting an instruction to call the destination; and communication means, responsive to the instruction, for reading the user-to-user information pre-registered in said registration means to provide read user-to-user information, and for calling the integrated services digital network by using the read user-to-user information in a SETUP message.

2. The apparatus according to claim 1, wherein said registration means registers the user-to-user information as one-touch dialing data.

3. The apparatus according to claim 1, wherein said registration means registers the user-to-user information as abbreviated dialing data.

4. A communication method of a facsimile apparatus for performing communication using user-to-user information included in a SETUP message for calling to an integrated services digital network, comprising the steps of:

manually inputting user-to-user information corresponding to a destination;

pre-registering the manually-input user-to-user information corresponding to the destination;

manually inputting an instruction to call the destination; and responsive to the instruction, reading the user-to-user information pre-registered at said pre-registering step to provide read user-to-user information, and calling the integrated services digital network by using the read user-to-user information in a SETUP message.

5. The method according to claim 4, wherein said registration step includes registering the user-to-user information as one-touch dialing data.

6. The method according to claim 4, wherein said registration step includes the step of registering the user-to-user information as abbreviated dialing data.

* * * * *

UNITED STATES PATENT AND TRADEMARK OFFICE
CERTIFICATE OF CORRECTION

PATENT NO. : 5,583,658

DATED : December 10, 1996

INVENTORS : KATSUHITO TAKEZAWA ET AL.

It is certified that error appears in the above-identified patent and that said Letters Patent is hereby corrected as shown below:

ON TITLE PAGE

[56] References Cited

"4,994,926  3/1991 Gordon et al." should read
--4,994,926  2/1991 Gordon et al.--.

COLUMN 3

Line 26, "machines" should read --machines or--.

COLUMN 8

Line 3, "even" should read --even when--, and "placed" should read --placed in--.

Signed and Sealed this

Fifth Day of August, 1997

Attest:

BRUCE LEHMAN

Attesting Officer

Commissioner of Patents and Trademarks